E. STEIGER.
ELECTRIC DEVICE FOR AUTOMATICALLY TURNING LIGHTS ON AND OFF.
APPLICATION FILED JUNE 17, 1916.

1,292,123.

Patented Jan. 21, 1919.
2 SHEETS—SHEET 1.

Inventor.
Eugen Steiger.
Per Ferdinand Bosshardt.
Attorney.

E. STEIGER.
ELECTRIC DEVICE FOR AUTOMATICALLY TURNING LIGHTS ON AND OFF.
APPLICATION FILED JUNE 17, 1916.

1,292,123.

Patented Jan. 21, 1919.
2 SHEETS—SHEET 2.

Inventor,
Eugen Steiger.
Per Ferdinand Bosshardt.
Attorney

UNITED STATES PATENT OFFICE.

EUGEN STEIGER, OF ZURICH, SWITZERLAND.

ELECTRIC DEVICE FOR AUTOMATICALLY TURNING LIGHTS ON AND OFF.

1,292,123.  Specification of Letters Patent.  Patented Jan. 21, 1919.

Application filed June 17, 1916. Serial No. 104,295.

*To all whom it may concern:*

Be it known that I, EUGEN STEIGER, a citizen of Switzerland, residing at Zürich, Switzerland, have invented certain new and useful Improvements in Electric Devices for Automatically Turning Lights On and Off, of which the following is a specification.

In hitherto known devices for automatically turning lights on and off, in which the turning on and off is effected by means of resistance cells sensitive to light (selenium cells), the chief defect lay in the fact that in order to insure the selenium resistance cells against damage by an overload of current, only very small currents could be employed, thereby necessitating a very sensitive system of apparatus which was difficult to make, that is to say requiring several coöperating relays to obtain the requisite strength of output of the electric current. In addition to this defect, comparatively large differences in the light were required to bring such devices into operation, and what was particularly unsuitable was the fact that in the case of street lighting installations such devices turned off the light too late in the morning. Furthermore, for operation by alternating current, fairly complicated devices were hitherto required.

Figure 1:
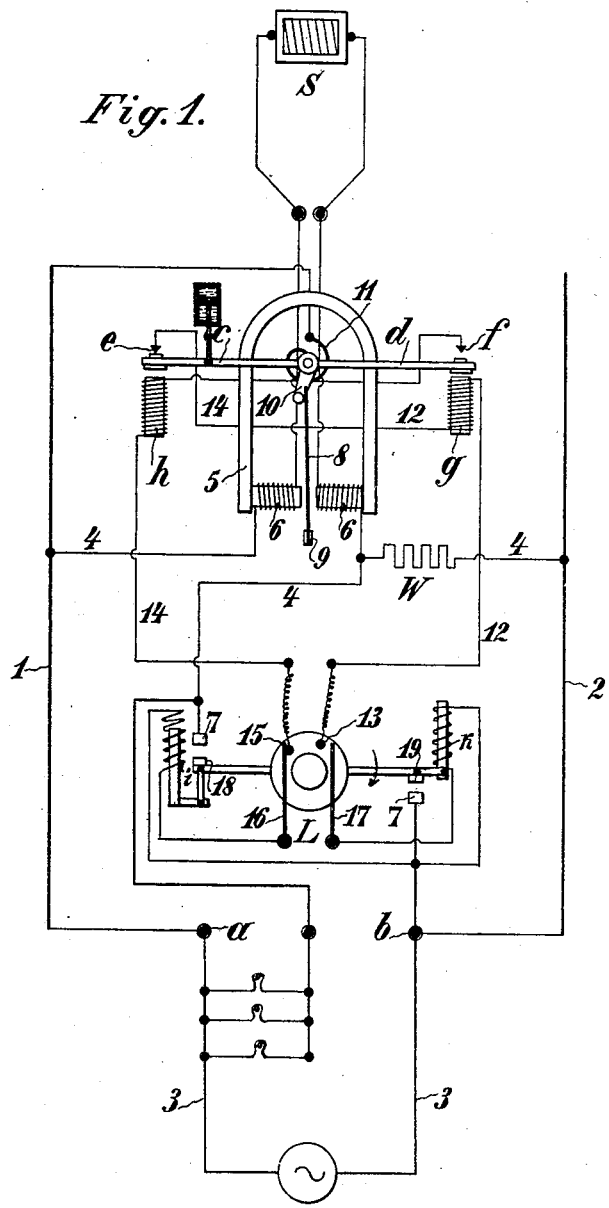

The subject of the present invention is capable of overcoming the above named defects which greatly prejudiced generalization in practice, if they did not even make such impossible, and the same is diagrammatically illustrated by way of example by two embodiments in the accompanying two sheets of drawings. The first embodiment relates to a device for turning lights on and off, which besides possessing great simplicity serves to produce a better operation and to guard against an overloading of the selenium cell when the same is more strongly lighted, while the second embodiment, having the same construction, is provided with a relay device which serves to increase the protection of the selenium cell and to render the operation of the device more prompt. Figure 1 shows a device in accordance with the first embodiment, and Fig. 2 a device in accordance with the second embodiment.

1, 2 are conductors, which are connected at $a$, $b$ to the main current conductors 3 of the circuit containing the lamps P it is desired to control and the generator Q supplying current to the same. A conductor 4 leads from the conductor 1 to the windings (magnet coils) 6 of a permanent horse-shoe magnet 5, and a selenium cell (selenium resistance) S is inserted in the circuit of the said magnet coils. According to variations in the natural light to which the selenium cell is exposed the resistance of the cell S is altered and thereby produces a corresponding change in the strength of current passing through the magnet coils 6. The conductor 4 branches off from the magnet coils 6, on the one hand, through a resistance (compensating resistance) W to the conductor 2, and on the other hand to one or two contacts 7 of a switch L inserted in the main circuit 3, 3 to control the same. The switch L when closed, connects up the conductor 4 to the main conductor 3, to which the conductor 2 is joined, and cuts out the compensating resistance W at $b$. 8 is a tongue (tongue diaphragm) secured at 9, and the free end of which lies against an arm 10 on an oscillatable two armed contact lever $c$, $d$ which is acted on by the springs 11 and is connected up to the conductor 1. $e$, $f$ are contacts which correspond with the double contact arms $c$, $d$. A conductor 12 leads from the contact $e$ through a solenoid $g$, to a changing contact 13 of the lighting current switch L. A conductor 14 leads from contact $f$, to a solenoid $h$, and from thence to changing contact 15 of the lighting current switch L. $i$, $k$ are electro-magnets, which force the lighting current switch L alternately in the switching on and switching off direction. The windings of the solenoid $i$ are connected on the one hand to a contact spring 16 which coöperates with the contact 15 and on the other hand to the main conductor 3 at $b$, which is joined to the collector 2, while the magnet $k$ is connected up on the one hand to the contact spring 17, which coöperates with the contact 13, and on the other hand also to the main conductor 3 at $b$. 18, 19 are the lighting current contacts, shown in their open position.

If, for example, alternating current passes through the conductor 4 and thereby through the windings of the polarized electro-magnets 6, the tongue 8 swings analogously with the current periods. The tongue deflects to a lesser extent when the flow of current is less owing to the higher resistance of the selenium cell, and to a greater extent when the flow of current is greater owing to the lower resistance of the selenium cell. These weaker (smaller) or stronger (larger) oscillations are transmitted from the tongue 8 to the double contact arms $c$, $d$ by the arm 10. When the oscillations are sufficiently reduced, the contacts $d$, $f$ are closed by the spiral spring 11, and current flows from the collector 1 through the spiral spring 11 and the arms 10 and $d$ to $f$ and from there through the contact magnet $h$, which is thereby excited and by attracting the arm $c$ improves the contact, to contact 15 and through the contact spring 16 into the windings of the solenoid $i$ of the current switch which results in an actuation of the latter in the direction shown by the arrow and the closure of the lighting current contacts 7, 18 and 7, 19. This movement of the current switch disengages the contacts 15 and 16 and establishes contact between 13 and 17. With stronger oscillations of the tongue, the action taking place at the double contact arms $c$, $d$ is similar but contact is made in that case at $c$, $e$. The contact magnet $g$ is thereby excited and the arm $d$ attracted; the current flows through the contacts 13, 17, the solenoid $k$ of the lighting current switch L is excited and moves the switch in a direction opposite to the arrow, whereby the contacts 7, 18 and 7, 19 are disengaged, the contact at 13, 17 is again broken and the contact between 15, 16 is reëstablished.

If there is a break at 7, 7 in the lighting current circuit 3 caused by excitation of the solenoid $k$, which is the case when daylight commences (at dawn), the operating current of the electro-magnets 6 has to pass through the compensating resistance W to the conductor 2, whereby the current flowing through the selenium cell is reduced and the selenium cell is relieved of a too heavy load of current as day light increases and its resistance falls. Owing to the increased resistance in the selenium cell circuit occasioned by the resistance W, the degree of oscillation of the tongue 8 necessary for closure of $d$, $f$ is attained more quickly and by decreasing light the switch L is closed sooner than otherwise would be the case. The resistance must of course be so chosen that a premature return of the contact arm $d$ to the contact $f$ does not take place, which would result in a premature operation of the lighting current switch in the turning on (lighting) direction. When the lighting current contacts 7, 7 are closed in the evening by engaging therewith of the contacts 18, 19 in the hereinbefore described manner, the current exciting the electro-magnets 6 instead of passing through the resistance W to conductors 2 and 3, takes the line of least resistance and flows through 7, 18, 19, 7 to $b$ and flows thence to conductor 3 with the result that the circuit resistance is reduced and a larger current flows through S. By increasing daylight (dawn) the resulting decrease in the resistance of the selenium cell S increases the current of the coils 6, 6 and produces engagement of the contacts $c$, $e$ and the opening of the switch L, thereby breaking the lighting circuit 3, 3. Owing to the resistance being cut off the circuit, the increase of current required to close the contacts is obtained more quickly than otherwise would be the case, and the operation of the switch L is more prompt.

When alternating current is employed, the double contact arms $c$, $d$ are provided in a suitable and known manner with a damping device (oil damping device or the like) O in order to prevent communication of the vibrations of the tongue 8 to the double contact arms $c$, $d$. This arrangement is unnecessary when continuous current is used.

Figure 2:
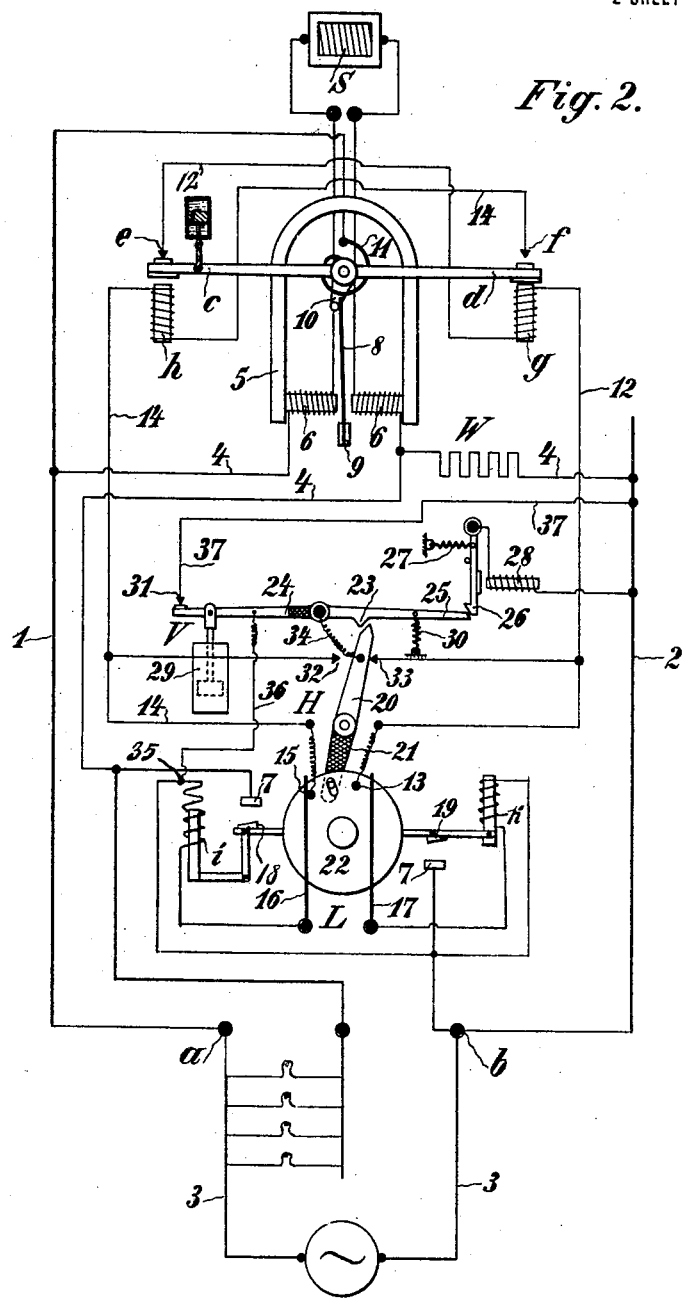

The automatic device for turning lights on and off, shown in Fig. 2, is similar to the hereinbefore described construction, but the same has a relay device H, the purpose of which has been hereinbefore set forth. 20, 21, Fig. 2, is a double armed oscillatable lever, the arm 21 of which is connected to but electrically insulated from the switch disk 22 of the lighting current switch L. A projection 23 on a double armed lever 24, 25 lies in the path of the arm 20. The arms of the double armed lever 24, 25 are electrically insulated from each other. The lever arm 25 faces a catch 26, which is acted on by a spring 27 in the direction of engagement and by an electro-magnet 28, when excited, in the direction of disengagement. The arm 24 is connected to a retarding device V acting in the known manner and in the form of an air cylinder 29, and in the position shown closes a contact 31 by the action of the spring 30. The electric connections of this relay device are as follows:—

The current passes from the conductor 1 through the spiral spring 11 when contact is made at $c$, $e$ or $d$, $f$. From there it passes, according to the position of the arm $c$, $d$, either to the lever arm $d$, through the contact $f$ and the conductor 14 to the contact 32, or through $c$, $e$ and 12 to the contact 33, and from one or the other of the contacts 32 and 33 through the lever arm 20 and the cable 34 to the lever arm 25. When the lever arm 25 contacts with the catch 26, the current further passes through the catch 26 and the electro-magnet 28 to the conductor 2. The arm 24 is connected up at 35 to the solenoids $i$, $k$ of the lighting current switch L by a cable 36, and when contact is made at 31 the arm 24 is also connected by means of the conductor 37, to the conductor 2. The conductors 12 and 14 are also connected to the contacts 13 and 15 in the same manner as in the first described device. When the switch disk 22 turns in opening and closing the lighting current switch L, the lever arm 21 of the double lever 20, 21 is moved with it, and the lever arm 20 presses on the projection 23 and forces the lever arm 25 into engagement with the catch, the lever arm 25 being however first lifted somewhat higher than is necessary for engagement. Owing to the retarding device V the lever arm 25 falls only slowly onto the tooth of the catch 26, where it makes contact and permits of the passage through the magnet coil 28, of the current, when such can flow. At the same time this movement of the double lever 24, 25 breaks the contact of the lever arm 24 at 31 and thereby cuts off the electro-magnets $i$, $k$ of the lighting current switch L from the conductor 2.

In the position of parts shown in Fig. 2, the lighting current switch L is open and the lever arm 20 makes contact with 33, whereby the lever arm 25 is connected up to the contact $c$, $e$ through the conductors 34 and 12. When the lever arm 20 presses on the contact 32, the arm 25 will be connected up to the contact $d$, $f$ by the conductors 34 and 14. In the shown position owing to the disengagement of the catch 26, the flow of current from either of the contacts 32 and 33 through the lever arm 25 to the magnet coil 28 and conductor 2 is interrupted. As the contact lever $c$, $d$ stands in the turning off position, and the current switch is open, there will be no flow of current to the lighting switch owing to the break at 13 in the circuit containing the conductor 12 and to the break at $f$ in the circuit containing the conductor 14. When contact is made at $f$ owing to an increase in the resistance of the selenium cell, for example at dusk, the current passes through 14 and the windings of the electro-magnet $h$ to 15, through the solenoid $i$, and conductors 36 and 37 to the conductor 2 and thereby operates the lighting switch and turns it on. The resulting movement of the disk 22 breaks the contact 15 and prevents further flow of current through the solenoid $i$ but makes contact at 32. The movement of the disk 22 also causes the lever arm 20 to engage the lever arm 25 with the catch 26, and to also disconnect the conductor 36 from the conductor 37 at 31 thereby preventing any flow of current through the lighting switch. Owing to the simultaneous cutting out of the compensating resistance W, by the closure of the lighting switch and the resulting stronger flow of current through the magnet coils 6, a stronger deflection of the tongue 8 takes place, which results in the contact $d$, $f$ being again broken. Owing to the breaks at 31 and 33 due to the new position of the lever 24, 25 and of the lever arm 20, no current can flow from the conductor 12 to the solenoid $k$ of the lighting switch and the same therefore remains in its " on " position. During the above described actions, contact is made at 25, 26 and at 32, but the conductor 14 is currentless because the circuit is again broken at $d$, $f$ when such contact is made.

When the decrease in the daylight becomes greater, that is to say, when darkness falls, the tongue 8 again swings more weakly and contact again takes place at $d$, $f$, and owing to the contact at 25, 26 and at 32, the electro-magnet 28 is excited by the current flowing from 14 through 32 and the catch is disengaged from the lever arm 25. A break in the contact at 25, 26 takes place therewith and contact is made at 31 and consequently preparation is made for the lighting current switch to turn off at dawn, when contact takes place at $c$, $e$ and the current flows through conductor 12, thereby energizing the electro-magnet $g$, through the contacts 13 and 17 and the windings of the solenoid $k$, and finally through 36 and 37 to conductor 2. The further actions take place in a corresponding manner to the equivalent actions at dusk.

By the employment of the relay device, it is possible to employ a higher compensating resistance than is the case with the embodiment shown in Fig. 1, which gives greater protection against an excessive loading of the selenium cell and in addition serves the chief purpose of dispensing with the requirement of a difference between the light at dusk and dawn to turn the lighting current switch L on and off, because the compensating resistance can be made effective to a higher degree, without an untimely turning on of the lighting current switch L, when the resistance is switched in and vice versa, taking place, owing to the break at 31 in the conductors leading to the electro-magnets $i$, $k$ and the change of the connection of the catch magnet 28 with the contacts $c$, $e$ or $d$, $f$.

In recapitulation of the above, it is to be stated that the resistance equalizes the change in resistance of the selenium cell by being brought into action when such resistance falls and out of action when the same rises, whereby the turning on and off of the light is made possible with the same degree of darkness.

The resistance device and relay device hereinbefore described and shown in Figs. 1 and 2 can of course not only be employed in connection with the hereinbefore described automatic device for turning lights on and off, but also with any device for that purpose which is capable of operation by means of a cell sensitive to light (selenium cell).

I claim:

1. In an electric device for automatically turning lights on and off, a resistance cell sensitive to light, a contact device controlled by said cell, switch relays controlled by said contact device, an arrangement comprising a resistance in circuit with said cell circuit, a bridge circuit across said resistance and opened and closed by said switch relays for the purpose of protecting the selenium cell from an overload of current and producing a timely actuation of the switch relays.

2. In an electric device for automatically turning lights on and off, a resistance cell sensitive to light, a contact device controlled by said cell, switch relays controlled by said contact device, an arrangement comprising a resistance in circuit with said cell, a bridge circuit across said resistance and opened and closed by said switch relays, and a circuit changing and breaking device operated by said switch relays and controlling the circuits containing said switch relays for changing over the contact device and transitorily disconnecting the lighting current switch from the contact device, for the purpose of allowing the resistance to be increased and the action of the resistance on the contact device and lighting current switch to be augmented.

3. In an electric device for automatically turning lights on and off, a resistance cell sensitive to light, a contact device controlled by said cell, switch relays controlled by said contact device, an arrangement comprising a resistance in the selenium cell circuit, a bridge circuit across said resistance and opened and closed by said switch relays, polarized electro-magnets in circuit with the selenium cell and a tongue situated between and oscillatable by the said electro-magnets and connected to said contact device for the hereinbefore specified purpose.

4. An electric device for automatically turning lights on and off comprising in combination a resistance cell sensitive to light, a contact device controlled by said cell, switch relays controlled by said contact device, an arrangement comprising a resistance placed in circuit within the selenium cell, a bridge circuit across said resistance and opened and closed by said switch relays, contact magnets in circuit with said contact device and acting on the said contact device, and pairs of contact surfaces in circuit with said contact device and closed to alternately excite the said contact magnets, for the purpose of strengthening the contact made by the said contact device.

Signed at Zurich, Switzerland, this 29th day of May, 1916.

EUGEN STEIGER.

Witnesses:
CARLO CUBLER,
OLGA M. MRIG.